US006783285B1

(12) United States Patent
Alexeff

(10) Patent No.: US 6,783,285 B1
(45) Date of Patent: Aug. 31, 2004

(54) IMAGE VIEWING DEVICE

(76) Inventor: Igor Alexeff, 2790 Oak Ridge Turnpike, Oak Ridge, TN (US) 37830

( * ) Notice: Subject to any disclaimer, the term of this patent is extended or adjusted under 35 U.S.C. 154(b) by 1057 days.

(21) Appl. No.: 09/218,763

(22) Filed: Dec. 22, 1998

Related U.S. Application Data

(63) Continuation-in-part of application No. 08/912,700, filed on Aug. 18, 1997, now abandoned.

(51) Int. Cl.$^7$ .............................................. G03B 17/02
(52) U.S. Cl. ...................................... 396/427; 348/164
(58) Field of Search .................... 348/164, 36, 143, 348/152, 207; 396/427; 359/364, 725

(56) References Cited

U.S. PATENT DOCUMENTS

| | | | | |
|---|---|---|---|---|
| 4,045,116 A | * | 8/1977 | La Russa | 359/364 |
| 4,908,705 A | * | 3/1990 | Wight | 348/145 |
| 5,185,667 A | * | 2/1993 | Zimmermann | 348/207 |
| 5,796,426 A | * | 8/1998 | Gullichsen et al. | 348/207 |

OTHER PUBLICATIONS

Pinhole Photography—History, Images, Camera, Formulas; By Jon Grepstad; 1996; 18 pages.

* cited by examiner

Primary Examiner—David M. Gray
(74) Attorney, Agent, or Firm—Harness, Dickey & Pierce, P.L.C.

(57) ABSTRACT

An image viewing device is described which is capable of producing images comprising at least a 180° field of view, also referred to as fisheye images. The device employs an extremely small aperture in conjunction with an optical block comprised of a refractive material. The light rays from an image pass through the aperture whereupon they are compressed in angle by the optical block to produce the fisheye image. An optional image intensifier may be employed to enhance the image produced by the optical block. Additionally, optional filters, viewers, and recording devices may be employed to enhance the image produced as well as to provide a permanent record of any images produced. The image viewing device is capable of producing high resolution color, black and white, and monochromatic fisheye images under various weather and lighting conditions.

36 Claims, 5 Drawing Sheets

US 6,783,285 B1

IMAGE VIEWING DEVICE

CROSS-REFERENCE TO RELATED APPLICATIONS

This application is a continuation-in-part application of U.S. patent application Ser. No. 08/912,700 entitled "Camera for Covert Surveillance", filed Aug. 18, 1997, now abandonded, the entire specification of which is expressly incorporated herein by reference.

FIELD OF THE INVENTION

This invention relates generally to surveillance devices and photography, and more particularly to an image viewing device for producing and viewing high resolution fisheye images under various operational parameters and lighting conditions.

BACKGROUND OF THE INVENTION

The camera is the basic instrument of photography. In its simplest form, a camera comprises a light-tight box with a lens at one end, which forms an image of the subject on light-sensitive film at the other end. A pinhole maybe substituted for the lens (e.g., a pinhole camera, camera obscura); however, this approach generally produces an image of the subject that is not sharp (i.e., poor resolution).

With reference to FIG. 1, there is shown a conventional camera 10, in accordance with the prior art. Nearly all modern cameras contain a glass or plastic lens or lens system 12 to focus a sharp image of the subject onto the film 14; a shutter 16 to control the length of time the film 14 is exposed, normally a fraction of a second; a viewfinder 18 to show the subject being photographed, and a mechanism (not shown) to hold the film and change film between exposures. A light-tight enclosure or housing 20 is also typically provided for protecting the film 14 from unintended exposure to the light. Many cameras include a lens aperture control (not shown) to regulate image brightness on the film. Advanced cameras may accept a variety of lenses for different photographic effects.

Cameras designed for still photography include, without limitation, the following types: box and other simple cameras, folding, 35-mm, reflex, press, view, instant picture, panoramic, electronic disk, underwater, aerial, stereo, medical, and document-copying or microfilm.

Cameras designed for action photography include, without limitation, the following types: videotape cameras, motion picture cameras, both conventional and high-speed, and television cameras—which are similar to photographic cameras but which use a light-sensitive electronic device instead of film.

Cameras have long been used for many purposes such as for surveillance, and especially covert surveillance. The availability of covert surveillance systems is of significant importance to certain groups, most especially the law enforcement and intelligence communities. The ability to detect and record images of subjects and events (especially those occurring in a interior portion of a room or a building) has permitted the gathering of evidence and information which had previously been difficult or impossible to do.

However, initial surveillance systems were unsatisfactory in that they did not permit the entire room to be viewed simultaneously. Typically, these surveillance systems employed a camera having a conventional lens systems wherein the field of view allowed the imaging of a relatively small area, typically a square or rectangular area directly in front of the camera. Therefore, events that occurred either below, above, or to the left or right of the field of view of a conventional camera escaped detection and recording by the surveillance system.

With reference to FIG. 2, there is shown a highly simplified conventional camera 22, in accordance with the prior art. In this view, only the lens 24, the film or image sensor 26, and the housing 28 are illustrated. As light rays L1, L2, L3, and L4 from an image enter the lens 24, they are focused and strike the image sensor 26 (e.g., film, semiconductor imager, etc.). It should be noted that only four light rays are shown in this view for ease of illustration. However, as previously noted, the main disadvantage of the conventional camera is that there is a limited field of view. As a result, only a relatively small portion of the total potential field of view can be viewed and recorded at any one given time.

In an effort to enlarge the field of view of surveillance systems, it was suggested that a camera having lens system capable of producing a 180° field of view be employed. This 180° field of view produces what is generally referred to as a "fisheye view." The term "fisheye view" refers to the fact that a fish sees a 180° image of the external world above water which is folded into a relatively narrow cone when it views the water surface from below. A fisheye view may be produced by a conventional fisheye lens, which is typically a very wide angle lens. The conventional fisheye lens magnifies the parts of the image near the focal point (e.g., center of the image) and simultaneously de-magnifies parts of the image that are far away from the focal point. When using such a conventional fisheye lens, there is no practical way for an individual or object to enter the room without being observed and recorded. Several models of conventional fisheye lenses that achieve at least a 180° field of view (including some that achieve a 220° field of view) are readily commercially available from Nikon, Inc (Nikon Product Numbers 1405 NAS, 1402 NAS, and 1910 NAS).

However, conventional fisheye lenses are generally large and bulky devices that project several inches away from the face of the camera housing, making them extremely difficult to easily conceal. In order to overcome this problem, it was suggested that a conventional fisheye lens camera be placed or mounted behind a hole or an aperture in a wall or other suitable opaque object, thus concealing the camera completely. However, conventional fisheye lenses would need a relatively large aperture in order to allow for a sufficiently large enough angle, thus defeating the purposing of concealing the camera behind the wall. Therefore, conventional fisheye lens cameras are unsuitable for covert surveillance purposes where it is intended to place the camera behind a very small hole in a wall.

Therefore, there exists a need for an image viewing device that is easily concealable for covert surveillance uses but that is also capable of producing and viewing high resolution fisheye views under various operational parameters and lighting conditions.

SUMMARY OF THE INVENTION.

In accordance with one embodiment of the present invention, an image viewing device comprises a member having an area defining an aperture, the light rays from the image entering through the aperture; and an optical block comprised of a refractive material, the optical block being located adjacent to the aperture, the optical block being capable of compressing the light rays from the image that pass through the aperture so as to produce an image comprising at least a 180° field of view.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from the detailed description.

DETAILED DESCRIPTION OF THE PREFERRED EMBODIMENT

Figure 1:
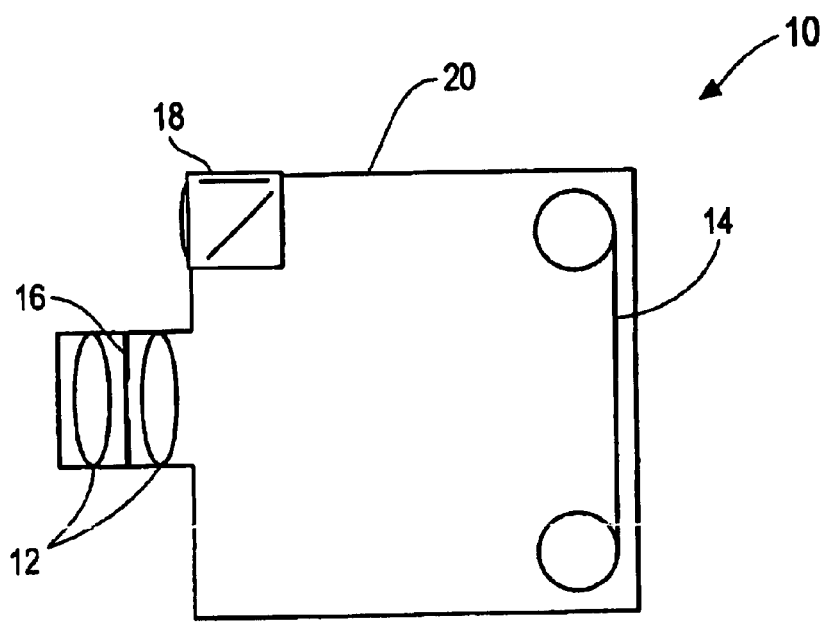
FIGS. 1 and 2 are cross-sectional views of prior art cameras.
Figure 2:
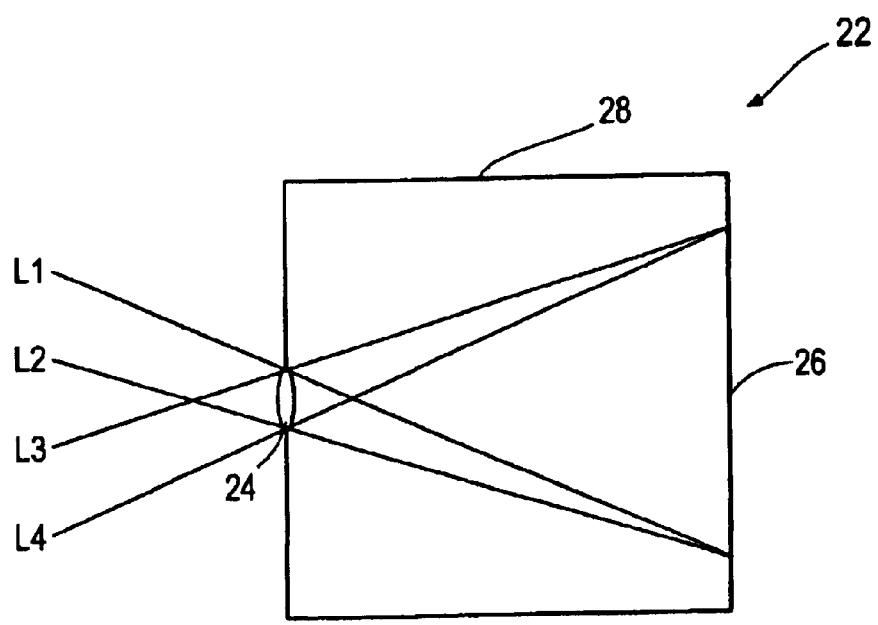
Figure 3:
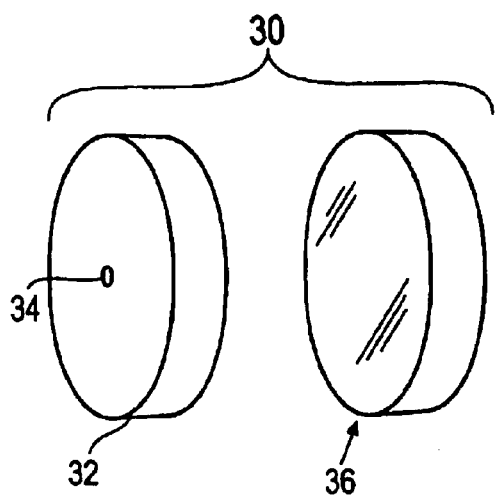
FIG. 3 is an exploded view of an image viewing device, in accordance with one aspect of the present invention.

With reference to FIG. 3, the image viewing device 30 is comprised primarily of two major components. The first component is a member 32 having an area defining an aperture 34 extending completely through the member 32 for allowing light rays to pass therethrough. The aperture 34 is preferably centered on the member 32. Associated with the member 32 is the second major component, an optical block 36 which preferably has a diameter approximately equal to the member 32. The exact configurations of the member 32 are not thought to be critical. In one embodiment, the member 32 is a round or oval cup-shaped device that receives a like-configured optical block 36. In another configuration, the member 32 is substantially planar member (not shown) with the optical block 36 being received in a separate enclosure or housing (not shown). In yet another configuration, both the member 32 and the optical block 36 are received in a single housing or enclosure (not shown). The main consideration is that once the member 32 and the optical block 36 are brought together into operational engagement, the optical block 36 must be contained in a light-tight enclosure. This is necessary to prevent the light rays that pass through the aperture 34 and into the optical block 36 from escaping, thus rendering any image unviewable.

Figure 4:
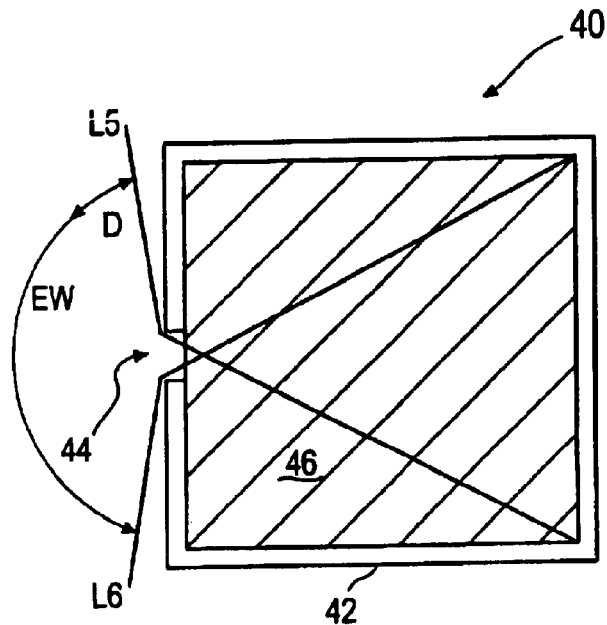
FIGS. 4 and 4A are cross-sectional views of an image viewing device, in accordance with one aspect of the present invention.
Figure 4A:
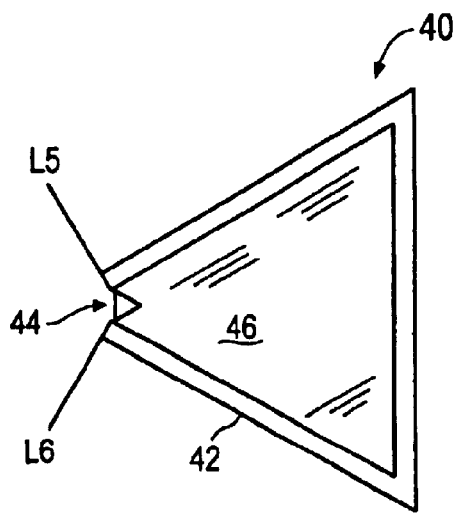

With reference to FIG. 4, an image viewing device 40 is primarily comprised of a housing 42, an aperture 44 (preferably centrally located on a surface of the housing 42 facing the subject to be imaged), and an optical block 46 (preferably filling or substantially filling the entire interior area of the housing 42. It should be noted that the configuration of the housing 42 is for illustrative purposes only. For example, the housing 42 could be configured to include a triangular portion tapering towards the aperture 44, thus reducing the amount of material needed for the housing 42 and the optical block 46 (see FIG. 4A). An optional viewfinder (not shown) could be provided on the surface of the housing 42 opposed from the aperture 44. However, it may be difficult for the naked eye to clearly make out the image, unless the rear surface of the optical block 46 is treated (e.g., sanding). However, additional optional devices may be used in conjunction with the present invention to enhance the resolution and viewability of the fisheye image generated. As light rays L5 and L6 from an image enter the aperture 44, they are compressed in angle by the optical block 46 to form the previously discussed fisheye image on the surface of the optical block opposed from the aperture 44. It should be noted that only two light rays are shown in this view for ease of illustration. However, as compared with conventional cameras, the main advantage of the present invention is that there is a much greater field of view. As a result, a relatively large portion (i.e., at least 180°) of the total potential field of view can be viewed and recorded at any one given time.

The present invention comprises an improved image viewing device which may be as small as may operate through a 100 micron hole or aperture (hence the term "pinhole" which refers to the very small size holes or apertures employed). The smallest possible hole is desirable for concealment, but for visible light, 100 microns is as small as can be used without suffering image degradation due to optical diffraction. The exact equation for the optimum pinhole diameter is given by:

$$D=\sqrt{L\lambda}$$

wherein D is the pinhole diameter, L is the distance from the pinhole to the photo receptor surface, and $\lambda$ is the wavelength of the light used. The 100 micron pinhole was designed using the specific equation given above for visible light at 5000 angstrom s and a pinhole to film distance of 2 centimeters. The 100 micron pinhole is merely illustrative of one embodiment of the present invention, and is not meant to limit the scope of the present invention. A larger pinhole may be used to increase the light gathering power and improve resolution by reducing diffraction, but has the dual disadvantages of reduction of concealment and optical complexity. Preferably the pinhole has a diameter from about 100 microns to about 1 centimeter.

Figure 5:
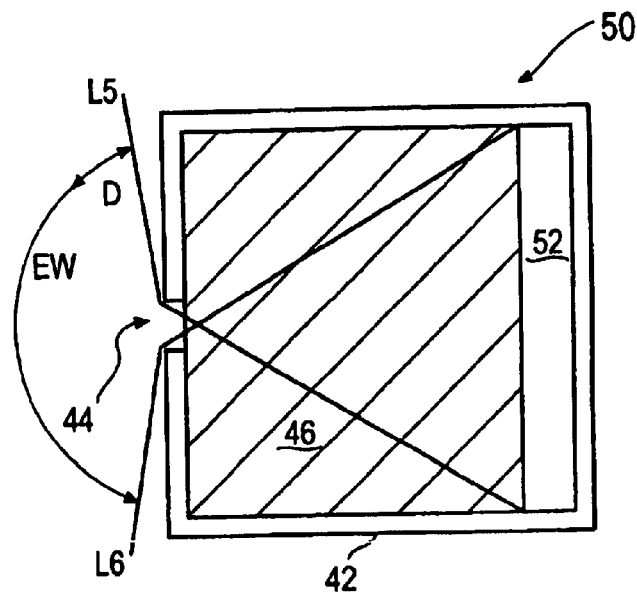
FIG. 5 is a cross-sectional view of an image viewing device with an optional image detection means associated therewith, in accordance with one aspect of the present invention.

In order to capture and record the fisheye image, an optional image detection means is preferably associated with image viewing device of the present invention. With reference to FIG. 5, an image viewing device 50 is similar to the one illustrated in FIG. 4; however, the difference lies in the use of an optional image detection means 52. The image detection means 52 of the present invention can be either photographic film (e.g., motion picture camera, still photographic camera), or a semiconductor element (e.g., videotape camera), or any other type of camera whose purpose is to capture and record images. For example, the rear portion of the image viewing device 50 could be adapted to receive a conventional camera (e.g., clamps, clips, threaded screw, etc.). Additionally, an optional viewfinder (not shown) can be provided to allow an operator to view the fisheye image generated before actuating the image detection means 52.

Figure 6:
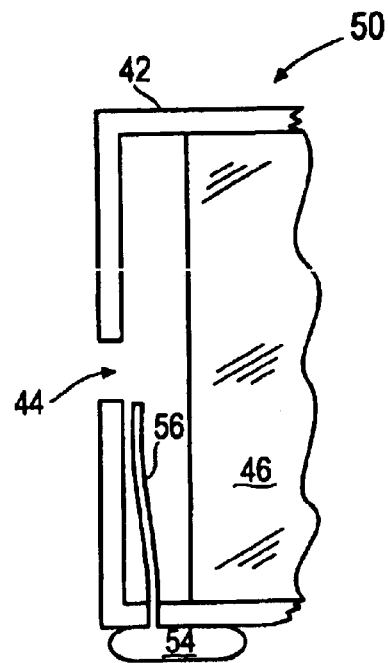
FIG. 6 is a partial cross-sectional view of an image viewing device with an optional cleaning means associated therewith, in accordance with one aspect of the present invention.

With reference to FIG. 6, an image viewing device 50 is similar to the one shown in FIG. 5; however, the difference lies in the use of an optional cleaning means 54. Because debris (e.g., snow, ice, etc.) and dust may form about the aperture 44 and on the surface of the optical block 46 closest to the aperture 44, the cleaning means 54 can deliver, by way of a non-limiting example, a measured amount of compressed gas or air through a conduit 56 outwardly toward the area surrounding the aperture 44 in order to loosen and remove any debris therefrom. Although only one conduit 56 is shown, it should be noted that a plurality of these structures may be employed to more efficaciously loosen and remove debris. Therefore, the image viewing device of the present invention can be programmed to be self-cleaning by the periodic application of pressurized gas or air about the aperture 44.

The image viewing device of the present invention operates at very low light levels, and also operates in the infrared. The image produced can be rectified and zoomed using available computer technology, such as digital image processing technology. As an example, Interactive Pictures Corporation (Oak Ridge, Tenn.) markets a software package to perform this function. The image viewing device of the present invention is simple, compact, rugged, and may be battery-powered. The image viewing device is capable of having full color capability at extremely low light levels. In addition, a new technology increases the resolution of the image as it is enlarged during zooming. The loss of resolution on zooming closer (loss of pixels) was a major criticism for the zooming system used on earlier 180° non-pinhole cameras.

One feature of the present invention was to provide the smallest practical aperture for covert surveillance system applications of the image viewing device of the present invention. The limitation is that if the aperture is too large, the image blurs because of the hole size. If the aperture is too small, the image also blurs due to the property of light known as diffraction. As previously noted, the optimum aperture size, i.e., not too large and not too small, is about 100 microns. This is in practical terms about one tenth the diameter of a pencil point. Thus, if one wishes to conceal the image viewing device behind an opaque object (e.g., a wall), a hole must be placed in that object approximately equal to the aperture size of the image viewing device. Normally, if the surface containing the hole is placed in front of an observer, he or she will be unable to locate it.

Figure 8:
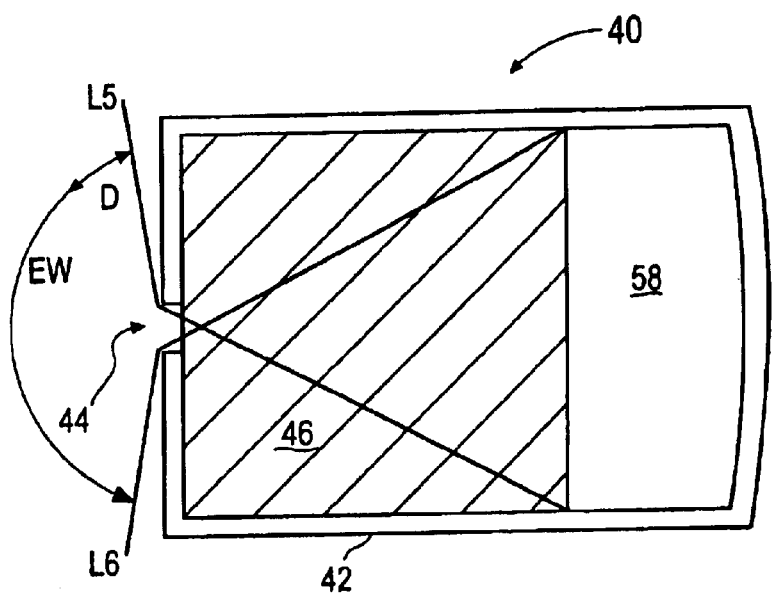
FIG. 8 is a cross-sectional view of an image viewing device with an optional image intensifier associated therewith, in accordance with one aspect of the present invention.
Figure 7:
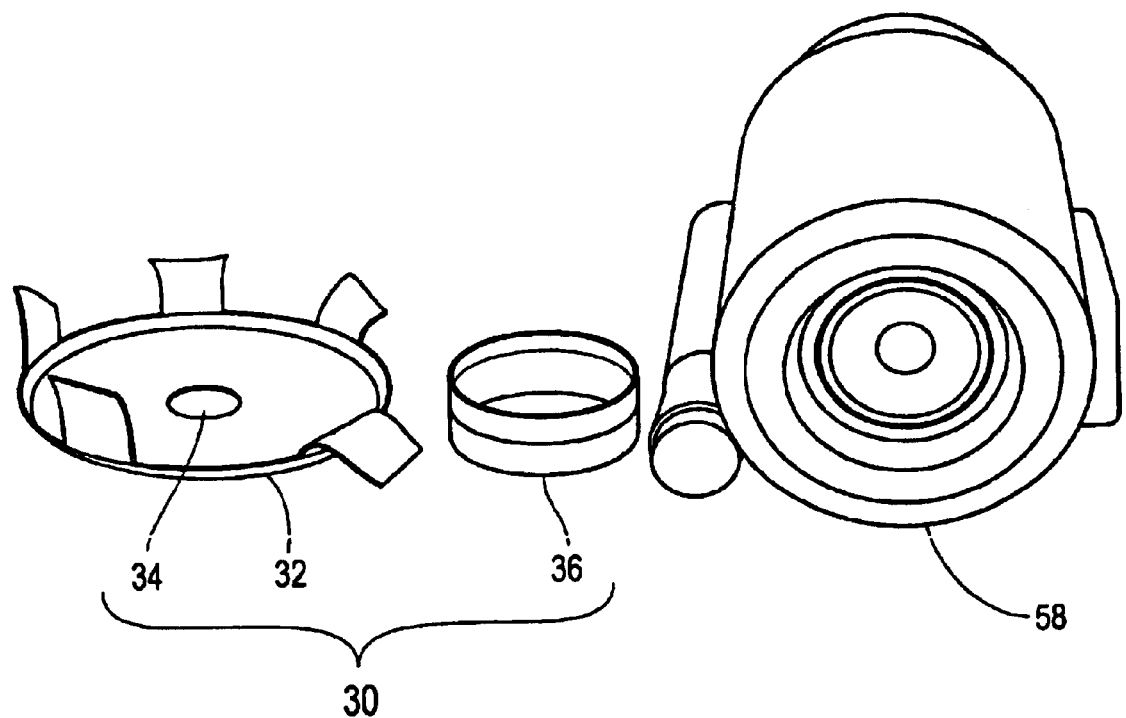
FIG. 7 is an exploded view of an image viewing device with an optional image intensifier associated therewith, in accordance with one aspect of the present invention.
Figure 9:
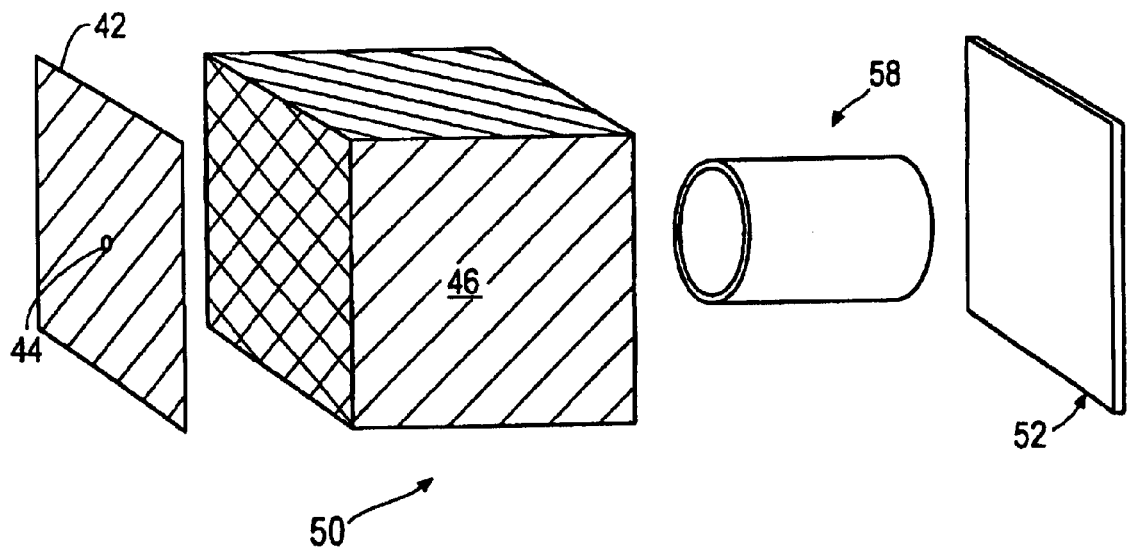
FIG. 9 is an exploded view of an image viewing device with an optional image intensifier and image detection means associated therewith, in accordance with one aspect of the present invention.

Another feature of the present invention was to provide a fisheye image that is easily visible with a high degree of resolution. Previous pinhole cameras suffer from insufficient light entering the lens, i.e. the pinhole is just too small. The present invention has solved this problem by using an image intensifier to enhance the image. With reference to FIG. 7, an image viewing device 30 is similar to the one shown in FIG. 3; however, the difference lies in the use of an optional image intensifier 58. The image intensifier 58 is generally required because the amount of light passing through a 100 micron pinhole, even under optimum lighting conditions, is too low to produce an acceptable image without intensification. The image intensifier 58 operates as follows: visible or infrared light strikes an electron emitting screen. These electrons are accelerated (given much energy) so that they then strike a fluorescent screen, which then in turn emits much more visible light than that originally striking the electron emitting screen. A thin metal film situated between the electron emitting screen and the fluorescent screen transmits electrons, but not light, thus preventing optical feedback. Preferably, the image intensifier 58 has a self-contained power source, such as a battery (not shown). It has been observed that currently available image intensifiers actually work so well that the image viewing device of the present invention works at extremely low light levels (i.e., approximately 80 times better than the unaided naked eye) at which human vision becomes impaired. In addition, the image intensifiers employed are sensitive to the near-infrared (i.e., 600 to 1000 angstroms). Human eyes cannot see in these wavelengths, so an interior room could be illuminated with infrared radiation to allow the image viewing device of the present invention to operate in a room that appears to be totally dark. An additional advantage of using the image intensifier 58 is that it can be optically coupled to the optical block 36 with glue, grease, or just contact pressure. In this way, the fisheye image never really leaves the optical block 36, but is transmitted to the image intensifier 58 without loss. With reference to FIG. 8, a non-limiting example of an image viewing device 50, similar to the one shown in FIG. 4, along with an optional image intensifier 58 is shown. With reference to FIG. 9, a non-limiting example of an image viewing device 50, similar to the one shown in FIG. 5, along with an image intensifier 58 is shown.

Image intensifiers are readily commercially available from Edmund Scientific Company (Barrington, N.J.). An intensification of 50,000 times is claimed by certain image intensifiers, giving the camera of the present invention a theoretical improvement of 80 times over the unaided naked human eye. The image intensifier used in the present invention can multiply the light emitted by the image by a magnitude of 10,000 times.

With respect to the operation of the image viewing device of the present invention, light rays from an image enter through the aperture, and upon entering the aperture, they are focused through the optical or dielectric block, which can be comprised of glass or plastic. The optical block should be made of a material which has a high index of refraction (preferably more than about 1, and still more preferably from about 1.5 to about 4), and that is transparent to the radiation being used. Glass or plastic is preferable for visible light. Silicon is preferable for the infrared, where the camera can be used to detect people in total darkness by body heat radiation alone. Summarizing, the optical block may be comprised of plastic, glass, refractive minerals such as quartz, materials transparent to infrared light such as silicon or germanium, and refractive liquids such as water. The optical block may be optically coupled by an optional interface or optical coupler (not shown) to the optional image intensifier. The optical coupler can comprise glue, pressure, or any other suitable material or device.

Figure 10:
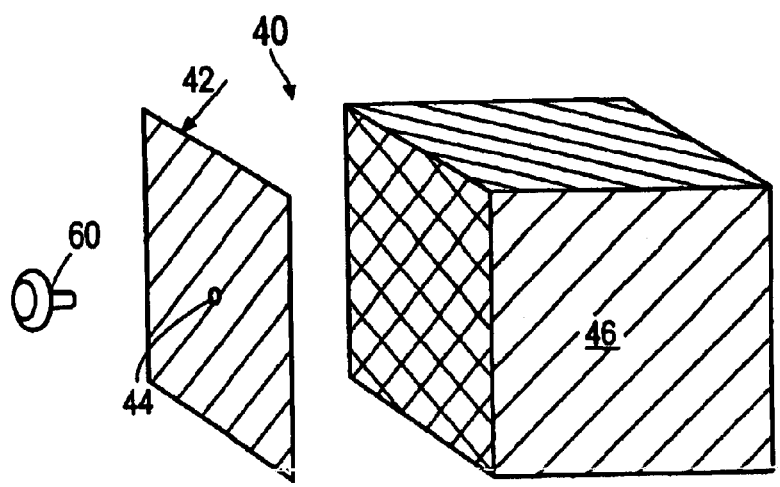
FIG. 10 is an exploded view of an image viewing device with an optional lens associated therewith, in accordance with one aspect of the present invention.

Referring now to FIG. 10, an image view device 40, is similar to the one shown in FIG. 4; however, the difference lies in the use of an optional lens 60, which is placed in front of aperture 44. The composition of lens 60 (actually a flat plate of about 10 times the aperture 44 diameter and a thickness about equal to the aperture 44 diameter) is of the same optical properties and material as the optical block 46. Alternatively, lens 60 could be harder than the material of the optical block 46 to resist wear and abrasion. The object of lens 60 is to improve light transmission through the aperture 44. However, the self-cleaning properties of the pressurized aperture 44 are lost due to the placement and location of lens 60. Note that lens 60 must be in physical contact with the optical block 46 to get the desired improvement. The placement of lens 60 allows for better viewing of the image to be produced by slightly improving the image at the edges. Additionally, this lens design is capable of producing field of view images greater than 180° and up to about 220°.

Another feature of the present invention is the ability to recover the color content of the fisheye image. Image intensifiers transmit the image by electrons, and thus lose the color content of the image. The intensified image is generally displayed as a green monochrome. Thus each green monochrome image from the image intensifier is viewed with a monochromatic video camera and transmitted to a recording computer. If a computer is being used to store and rectify the image data, with the information that it really is a red, yellow, or blue image, the computer reconstructs the image in natural color.

Figure 11:
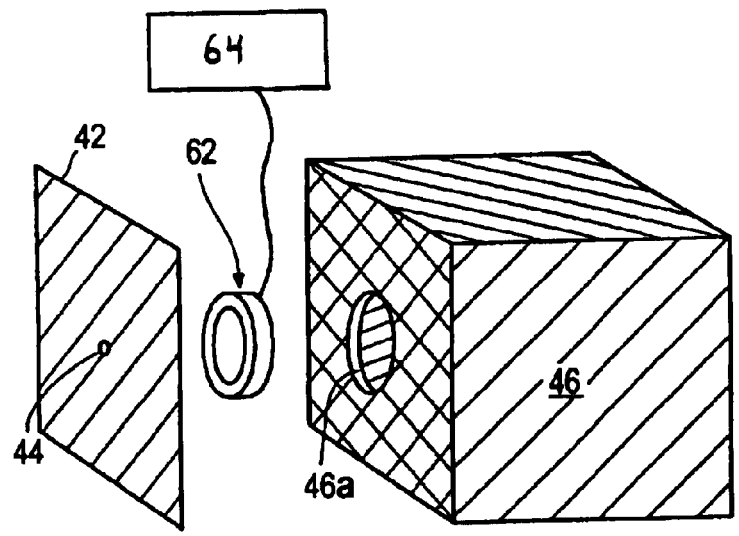
FIG. 11 is an exploded view of an image viewing device with an optional color filter associated therewith, in accordance with one aspect of the present invention.

The present invention has corrected this color content loss problem by placing an electrically tuned color filter behind the aperture and being optically coupled to the optical block, of course. With reference to FIG. 11, an image viewing device 50, is similar to the one shown in FIG. 9; however, the difference lies in the use of an electrically tuned color filter 62 (Displaytech, Boulder, Colo.). Preferably, the color filter 62 is disposed in a recess 46A on the surface of the optical block 46 so as to be coplanar with the surface of the optical block 46. Preferably, a control system 64 is in electrical communication with the color filter 62 so as to be able to control the operation of the color filter 62. Additionally, optional components such as, but not limited to, video cameras (not shown) and black and white video viewers (not shown) may be employed.

By way of a non-limiting example, several color filters may be electrically connected to the control system. When the proper voltages are applied to each color filter, the filters restrict the spectral range by eliminating certain wavelengths of visible light. For example, a red filter will absorb green and blue light, leaving only red light to transmit. If the same voltages are applied to each filter, they transmit the same color. Thus, for example, the first color filter admits green to the intensifier. At a viewing screen, a black and white image that represents green is displayed. The operator views this image through the second color filter to see a green image. The colors are then cycled to produce a full color image in the eye. The color filters can be solid state tunable color filters.

Another feature of the present invention is to preserve the resolution of the image as you zoom in on a subject. The former technique used in electrical zooming simply used a computer to expand a part of the image. This expansion is simply spreading the obtained information over a larger area, and thus the image just gets fuzzy or unresolved. This loss of resolution was considered to be a major defect of previous pinhole camera systems. The present invention has corrected the zooming loss of resolution in two ways. First, the present invention employs a system that electrically (not mechanically) expands the image on a given image chip. The same company which also produces the electrically switchable color filters (Displaytech, Boulder, Colo.) also manufactures an electrically operable polarized light rotator. Thus, you can have light pass through a polarizer, and rotate the plane of polarization by ninety degrees. Then, a thin slab of the mineral calcite is placed across the optical path. The material does not have to be only calcite; it can be any other suitable transparent, doubly-refracting material. However, calcite is double refracting, so when the plane of polarization is rotated, the image moves sideways. Presently, a video camera recording chip is made of a finite number of pixels that are separated by dead space. In other words, the chip is only looking at about ¼ of the image. If one were to take one image, store it in the computer, move the image a ½ pixel spacing, and take a second image, we have doubled the amount of information received, and a recording computer can enhance the image. By repeating this process in several directions, the image can be further enhanced. Thus, more information is gathered on a single pickup chip at the cost of slowing down the system response time.

A second technique is provided by using a second product from Displaytech (Boulder, Colo.), that being an electrically operated, non-mechanical shutter. Optionally, a semitransparent beamsplitter on each leg which has a separate electro-optical shutter can also be employed. By leg, it means two or more optical paths, created by optical beamsplitters, and chosen by opening or closing possible optical shutters. However, it should be noted that the optical shutters may be unnecessary, because one channel can be activated by simply turning off or on the appropriate computer recording chip. When you wish to have the full image, the electro-optical shutter directs the full image to one computer vision chip. If you wish to zoom in on a part of the image, this shutter is closed, and another is opened that views only part of the image. This fraction of the image is viewed by a complete chip, so that even if the image is enlarged, the resolution remains the same. The process can go through several stages, increasing the resolution without image degradation. The basic problem is that zooming occurs in discrete stages, but a computer can be adjusted to smooth and overlap the transitions.

Figure 12:
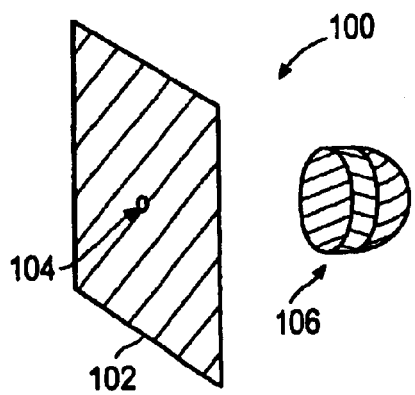
FIG. 12 is an exploded view of an image viewing device with an alternative optical block associated therewith, in accordance with one aspect of the present invention, The same reference numerals refer to the same parts throughout the various Figures.

In an alternative embodiment, the present invention has eliminated the image intensifier and loss of color information, and has improved the resolution of the image at the cost of expanding the aperture by a factor of 20. The alternative embodiment, however, still maintains the 180° field of view. The aperture is now about the size of a thick pencil lead, i.e., 2000 angstroms. With the larger pinhole, the alternative embodiment employs a specially designed lens located behind the aperture to focus the light and greatly reduce the loss of resolution by diffraction. This configuration allows the light to escape and acts as a lens to focus light on the image detection means. If the surface of the lens is approximately normal to the path of the light ray, it can pass through without being reflected. With reference to FIG. 12, an image viewing device 100 is comprised of two major components: (1) a member 102 with an area defining aperture 104 extending completely through the member 102; and (2) an optical block 106 that is intended to function both as an image compressor and as a lens. The optical block 106 comprises a specially designed dielectric or optical block which is curved on one side and which fills almost the entire interior area of the enclosure (not shown). The optical block 106 must have a spherical or parabolic surface 108 facing the image detection means (not shown) such that two conditions are satisfied: (1) the surface must be approximately normal to the light path inside the optical block 106 so that light may escape and not be internally reflected; and (2) the surface of the optical block 106 acts as a convex lens and focuses the parallel light rays inside the optical block 106 onto the image detection means (not shown) outside the optical block 106. What is meant by the term "filling almost the entire camera" is that the size of the optical block 106 and the size of the airspace between the optical block 106 and the image detection means (not shown) are balanced to produce the proper sized, in-focus image on the image detection means (not shown). As an example, an approximate calculation calls for the optical block 106 to fill about half of the space inside the enclosure (not shown) to achieve the desired result. This lens design is not color corrected at present, so the image, when viewed by the naked eye, shows color fringing. However, this color fringing may be easily corrected with a computer.

While preferred embodiments of the present invention have been shown and described, it will be understood that there is no intent to limit the invention by such disclosure, but rather, it is intended to cover all modifications and alternate embodiments falling within the spirit and scope of the invention as defined in the appended claims.

What is claimed is:

1. An image viewing device, comprising:
    a member having an area defining an aperture, light rays from the image entering through the aperture; and
    an optical block comprised of a refractive material, the optical block being located adjacent to the aperture, the optical block being capable of compressing the light rays from the image that pass through the aperture so as to produce an image comprising at least a 180° field of view.
2. The image viewing device according to claim 1, wherein the optical block has a substantially flat surface facing towards the aperture.
3. The image viewing device according to claim 2, wherein the optical block has a substantially spherical surface opposite the flat surface.
4. The image viewing device according to claim 1, wherein the optical block abuts the member having an area defining an aperture.
5. The image viewing device of claim 1, further comprising a housing for receiving the optical block, wherein the housing is substantially light tight.
6. The image viewing device of claim 1, further comprising an image detection means, the optical block being located between the aperture and the image detection means, the image detection means being capable of viewing and recording the image produced by the optical block.
7. The image viewing device according to claim 1, further comprising an image intensifying means for intensifying the image produced by the optical block.
8. The image viewing device according to claim 7, further comprising a recording means for recording the image produced by a device selected from the group consisting of the optical block, the image intensifying means, and combinations thereof.
9. The image viewing device according to claim 1, wherein the optical block has an index of refraction in the range of more than about 1.
10. The image viewing device according to claim 1, wherein the optical block has an index of refraction in the range of about 1.5 to about 4.
11. The image viewing device according to claim 1, wherein the aperture has a diameter in the range of about 100 microns to about 1 centimeter.
12. The image viewing device according to claim 1, wherein a color image is produced.
13. The image viewing device according to claim 1, wherein a monochromatic image is produced.
14. The image viewing device according to claim 1, wherein a black and white image is produced.
15. The image viewing device according to claim 1, wherein a portion of the optical block extends through the aperture, the portion of the optical block extending through the aperture focusing the incoming light rays from the image.
16. An optical device comprising:
    a member defining an aperture operable to permit light rays to pass therethrough; and
    an optical block having a first surface disposed adjacent to the aperture and a second surface opposite the first surface, the optical block including refractive material operable to compress light rays passing through the aperture and produce an image at the second surface.
17. The optical device according to claim 16, wherein the optical block abuts the member.
18. The optical device according to claim 16, further comprising a gap between the optical block and the member.
19. The optical device according to claim 16, wherein the image is a fisheye view.
20. The optical device according to claim 16, further comprising a light-tight housing for the optical block.
21. The optical device according to claim 16, further comprising an image detection means, the optical block being located between the aperture and the image detection means.
22. The optical device according to claim 21, wherein the image detection means is operable to view the image produced by the optical block.
23. The optical device according to claim 16, further comprising an image intensifier operable to intensify the image.
24. The optical device according to claim 23, further comprising a recorder operable to record the image produced by the image intensifying means.
25. The optical device according to claim 16, further comprising a recorder operable to record the image produced by the optical block.
26. The optical device according to claim 16, further comprising a cleaning mechanism operable to clean debris from at least one of the aperture and the first surface.
27. The optical device according to claim 26, wherein the cleaning mechanism includes a selectively operable source of compressed air.
28. The optical device according to claim 16, further comprising a color filter in optical communication with the optical block and operable to selectively filter wavelengths of the light rays.
29. The optical device according to claim 16, wherein the optical block has an index of refraction in the range of more than about 1.
30. The optical device according to claim 16, wherein the optical block has an index of refraction in the range of about 1.5 to about 4.
31. The optical device according to claim 16, wherein the aperture has a diameter in the range of about 100 microns to about 1 centimeter.
32. The optical device according to claim 16, wherein the image is a color image.
33. The optical device according to claim 16, wherein the image is a monochromatic image.
34. The optical device according to claim 16, wherein the image is a black and white image.
35. The optical device according to claim 16, wherein a portion of the optical block extends through the aperture.
36. The optical device according to claim 35, wherein the portion of the optical block extending through the aperture is operable to focus the light rays.

\* \* \* \* \*